July 3, 1951          J. TULLIS          2,558,995
BAG STOOL COMBINATION
Filed July 10, 1946
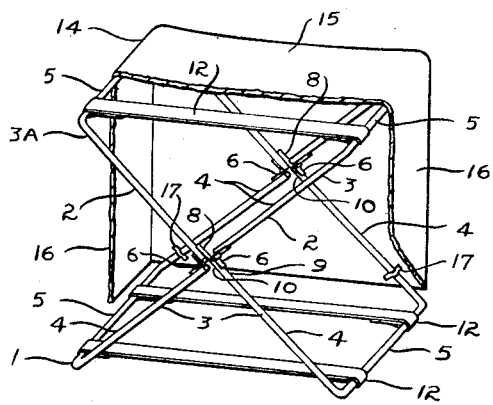
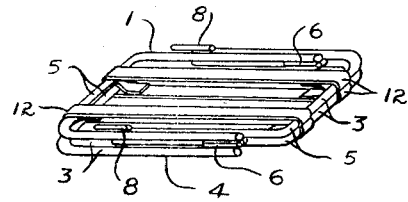
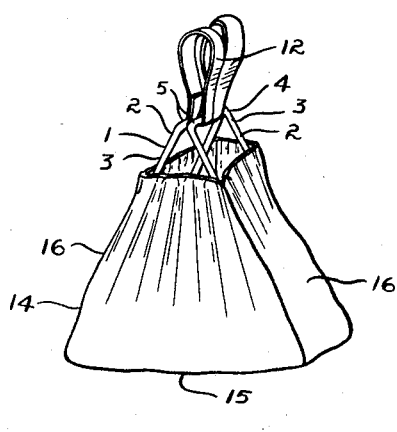
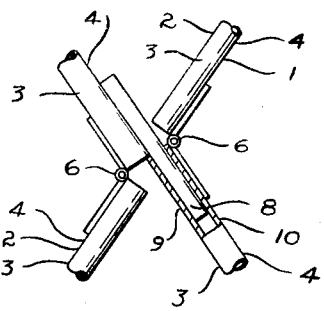
INVENTOR
JOHN TULLIS
ATTORNEY Patented July 3, 1951

2,558,995

UNITED STATES PATENT OFFICE 2,558,995

BAG STOOL COMBINATION

John Tullis, Vancouver, British Columbia, Canada

Application July 10, 1948, Serial No. 38,041

3 Claims. (Cl. 155—149)

My invention relates to improvements in bag stool combination, which is particularly designed for use for carrying as a shopping bag to serve as a receptacle in which articles may be packed for transport in the trunk of an automobile for picnicking and the like, and to be used when not so employed, as a stool or small table.

The object of the invention is to provide an article which is capable of conveniently and safely carrying an extensive load and one which when used in inverted position will be of sufficient rigidity as to safely support an adult person sitting thereon, while being of such light weight as to be easily carried with a normal load.

Referring to the drawings:

Figure 1 is a perspective view of the device set up for use as a stool, shown with a portion of the enclosing bag removed.

Figure 2 is a perspective view of the device when inverted for parcel carrying.

Figure 3 is a perspective view of the frame only collapsed and folded for stowage.

Figure 4 is a detail view of the jointing of the frame members.

In the drawings like characters of reference indicate corresponding parts in each figure.

The numeral 1 indicates generally a frame consisting of two pairs of hinged sides 2, each hinged side is made of light rigid tubular parts 3 in the form of a U in which the legs 4 are parallel to each other and the base 5 is at right angles thereto. Each side 2 is made up of a pair of such U-shaped parts with their legs connected together with hinges 6 which are adapted to be folded, when the device is collapsed for stowage, into contact with each other, as shown in Figure 3.

One of the parts 3, indicated as 3A in Figure 1, is fitted at the free end of its legs 4 with a dowel 8 which is adapted to project beyond the said end and which is adapted to be detachably inserted into the end 9 of the legs of a complementary U-shaped part as at 10. The bases 5 of the two upper parts 3 and of the lower parts 3 are connected together by pieces of tape 12 or other flexible tensional material to prevent the bases 5 of the several parts 3 from spreading beyond a normal distance of separation.

The frame 1 is covered with a bag 14 of any suitable material, which is attached to the legs 4 of some of the parts 3. The bottom 15 of the bag is of a dimension to fit the upper dimensions of the frame and serve as a seat when the frame is set in the position shown in Figure 1 and its sides 16 extend when in such position down substantially to the floor level. When set in the above mentioned position, the lower right legs 4 of the parts 3 are rigidly held in offset but substantially aligned position with the upper left legs 4 of the frame and since the bases of the U-shaped parts are limited in their outward movement by the tapes 12, said frame will form an effective seat or small table. Clips or loops 17 are secured to the inside of the bag, which are slidable upon the legs 4 to hold the bag sides to the frame when being used as a container as shown in Figure 2. The bottom 15 may be secured to the frame 1 or to the straps 12 by any convenient means such as sewing or riveting.

To use the device as a shopping bag, the device is inverted, the dowels 8 are withdrawn from the ends 9 of the legs in which they were inserted, then the tapes 12 on the then uppermost bases 5 can be used as loops through which the forearm may be inserted for carrying the bag 14, or the device may be carried by grasping the upper bases 5.

If it is desired to collapse the bag for stowage, it suffices to separate the dowel connected legs 4 of the parts 3 and to fold the two U-shaped parts of each U-shaped member and lay them one upon the other as shown in Figure 3. The bag 14 may then be folded over to enclose said parts, thus making a convenient parcel for putting away until next needed.

What I claim as my invention is:

1. A bag stool combination comprising a frame formed of two side members, each side member consisting of two U-shaped parts having a base and a pair of parallel legs, the legs of one of said parts being hingedly connected at their outer ends to the legs of the complementary U-shaped part, said legs being tubular at their free ends, dowels extending parallel to the free ends of one pair of legs of one side member adapted to enter the tubular free ends of complementary legs of the other side member, and an open ended bag for enclosing a portion of the frame, said open end of the bag being attached to some of the legs of the frame.

2. A bag stool combination comprising a frame formed of two side members, each side member consisting of two U-shaped parts having a base and a pair of parallel legs, the legs of one of said parts being hingedly connected at their outer ends to the legs of the complementary U-shaped part, said legs being tubular at their free ends, dowels extending parallel to the free ends of one pair of legs of one side member adapted to enter the tubular free ends of complementary legs of the other side member and flexible means extending between complementary bases of side members at the top of the stool frame and at the bottom of the stool frame for preventing the spreading of the bases horizontally and a flexible enclosure for the frame, said enclosure being united to said frame as a unit.

3. A bag stool combination comprising a two member frame, each member consisting of two U-shaped parts hingedly connected together at their free ends, each of said parts having a pair of legs and a base portion, the free ends of the legs of one of the U-shaped parts being provided with means for engaging the free ends of the legs of another U-shaped part to hold said connected parts in close parallel position, a bag shaped to fit and cover the top and sides of the stool, said two member frame being united to said bag whereby the bag helps to support the frame in open position when distended.

JOHN TULLIS.

REFERENCES CITED

The following references are of record in the file of this patent:

UNITED STATES PATENTS

| Number | Name | Date |
|---|---|---|
| 782,393 | Hazelton | Feb. 14, 1905 |
| 1,479,769 | Yamanishi | Jan. 1, 1924 |
| 2,375,819 | Reid | May 15, 1945 |

FOREIGN PATENTS

| Number | Country | Date |
|---|---|---|
| 111,098 | Switzerland | July 16, 1925 |